No. 874,378. PATENTED DEC. 24, 1907.
W. H. ALLEN.
CONNECTION FOR GAS TUBES.
APPLICATION FILED DEC. 26, 1906.

WITNESSES: INVENTOR
E. A. Pell William H. Allen
R. Johnson BY
Wm. H. Campfield
ATTORNEY

UNITED STATES PATENT OFFICE.

WILLIAM H. ALLEN, OF NEWARK, NEW JERSEY.

CONNECTION FOR GAS-TUBES.

No. 874,378.　　　Specification of Letters Patent.　　　Patented Dec. 24, 1907.

Application filed December 26, 1906. Serial No. 349,508.

*To all whom it may concern:*

Be it known that I, WILLIAM H. ALLEN, a citizen of the United States, residing at Newark, in the county of Essex and State of New Jersey, have invented certain new and useful Improvements in Connections for Gas-Tubes; and I do hereby declare the following to be a full, clear, and exact description of the invention such as will enable others skilled in the art to which it appertains to make and use the same, reference being had to the accompanying drawings, and to letters of reference marked thereon, which form a part of this specification.

This invention is a device to be attached to the gas cock or connection of a gas stove, or any similar apparatus, and the connections of the house pipes with flexible tubing, and is designed to secure to it the nozzle end or connection of a flexible hose to prevent the hose being accidentally detached from the stove, or similar article, either by a longitudinal pull or by a transverse twisting. Many cases of asphyxiation are caused by the accidental releasing of a flexible gas hose from a lamp or stove, disconnection being sometimes caused by a person tripping over the connection and not noticing the severing of the hose. The rubber end of the tubing, from constant use, becomes distended and somewhat set and this device insures a tight connection between such a used end and a gas fixture.

This device embraces a wire structure that is designed to have a grasping connection with the gas cock, and to be swung over onto the flexible connection beyond the spout of the gas cock, and to embrace the flexible connection in a spring arch that is open, on one side, to permit the withdrawal of the device from the tube, when necessary.

The invention is illustrated in the accompanying drawings, in which

Figure 1:
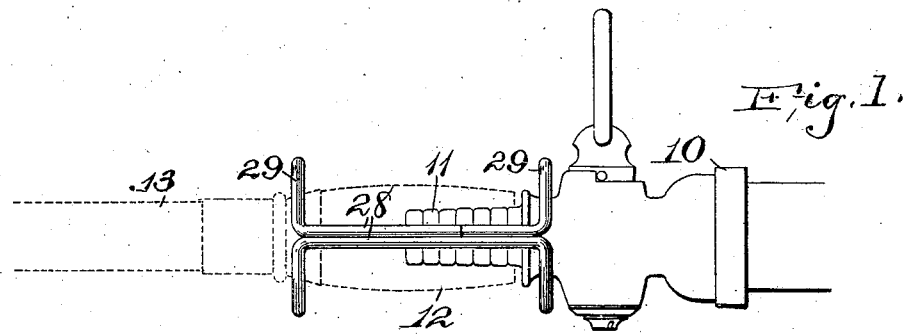
Figure 2:
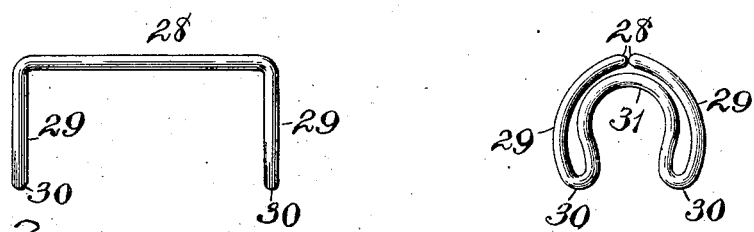
Figure 3:
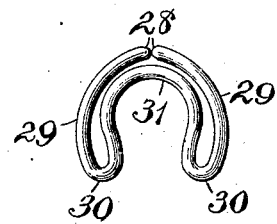
Figure 4:
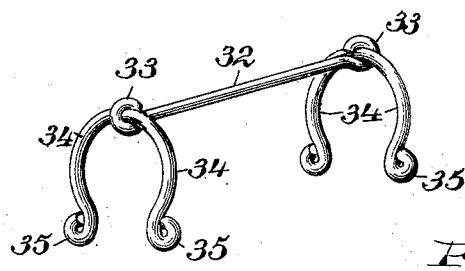

Figure 1 is a view of a gas cock showing the gas tube in dotted outline, and illustrating a clamp of the kind described. Fig. 2 is a side view of the device, and Fig. 3 is an end view of the same. Fig. 4 is a perspective view of a modified form.

In Figs. 1, 2 and 3, I show a clamp that is made of one piece of wire and bent into parallel straight strands 28, and on the ends of the device the wire is bent to form the curved members 29, then the loops 30, and being finished off into a spring arch 31. This structure allows both ends thereof to be sprung into place from the side, but at the same time the end engaging the flexible connection of the tubing can be swung to one side by reason of the slight pivotal action that would be present in the end that was clamped to the gas cock. The end of this device, that is shown sprung on the cock between the spout and the finger piece, can be installed beyond the finger piece.

Another form is shown in Fig. 4 where one strand 32 is used in place of the double strands 28 in Fig. 1, this single strand being provided, on its opposite ends, with eyes 33. Wire members are fitted into the eyes 33, and are bent to form the spring arches 34, the ends of the spring arch being made into the loops 35.

These devices go to make up a cheap connector, one that is quickly attached and detached, and also one that is safe because it will securely attach the gas tube to the fixed connection.

The device is made very desirable by reason of the spring arch that is open on one side to allow its lateral installation and removal in relation to the gas tube, and at the same time the loops on the ends of the spring arch contracting this open end, provides against any accidental removal of the spring arch from the tube.

The clamp can be attached to the gas cock at any of its reduced portions to prevent longitudinal movement, but I may make the gas cock with a reduced portion between the valve and the tapered tip so that the clamp cannot slide off.

Having thus described my invention, what I claim is:—

1. In combination with a gas cock having a reduced portion and a tube sliding on the end of the gas cock, of a clamp formed of wire having open ended transverse spring arches on the ends, one arch being adapted to embrace the reduced portion of the gas cock, and the other arch being adapted to clamp the tube, the clamp being thus adapted to be rotatably arranged on the tube and to have the arches applied simultaneously, the arches clamping by their own spring action.

2. In combination with a gas cock having a reduced portion and a tube sliding on the end of the gas cock, of a clamp formed of wire having open ended transverse spring arches on the ends, one arch being adapted to embrace the reduced portion of the gas cock, and the other arch being adapted to clamp the tube, the clamp being thus adapted to be rotatably arranged on the tube and to have the arches applied simultaneously, the arches clamping by their own spring action, each arch consisting of curved side members, loops on the ends of the members and merging from the loops into an arch.

In testimony, that I claim the foregoing, I have hereunto set my hand this 24th day of December, 1906.

WILLIAM H. ALLEN.

Witnesses:
  WM. H. CAMFIELD,
  E. Q. PELL.